United States Patent
Irie et al.

(10) Patent No.: US 6,363,309 B1
(45) Date of Patent: Mar. 26, 2002

(54) BEHAVIOR CONTROL DEVICE OF VEHICLE HAVING MEANS FOR AVOIDING MISCONTROL DUE TO NEUTRAL SHIFT OF YAW RATE SENSOR

(75) Inventors: Yoshiaki Irie, Susono; Yoshiaki Matsuo, Tagata-gun, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/098,419

(22) Filed: Jun. 16, 1998

(30) Foreign Application Priority Data

Jul. 23, 1997 (JP) .............................................. 9-212647

(51) Int. Cl.7 .............................. G06F 7/70; B60G 23/00
(52) U.S. Cl. .............................. 701/70; 701/36; 701/38; 701/72; 303/140; 303/146
(58) Field of Search .............................. 701/69, 70, 71, 701/73, 74, 75, 76, 79, 82, 83, 89, 90, 92, 36, 37, 38, 72, 41; 303/139, 140, 146, 147, 163, 116.2, 122.08; 280/5.51, 5.512, 5.513, 5.504; 180/410, 412, 422, 197, 413, 415

(56) References Cited

U.S. PATENT DOCUMENTS

| | | | |
|---|---|---|---|
| 5,228,757 A | * 7/1993 | Ito et al. ..................... 303/146 |
| 5,332,300 A | 7/1994 | Hartmann et al. .......... 303/146 |
| 5,642,281 A | * 6/1997 | Ishida et al. .................. 701/41 |
| 5,667,286 A | * 9/1997 | Hoying et al. ............... 303/140 |
| 5,700,073 A | * 12/1997 | Hiwatashi et al. ........... 303/146 |
| 5,704,695 A | * 1/1998 | Monzaki et al. ............. 303/146 |
| 5,719,790 A | 2/1998 | Lohrenz et al. ................ 701/36 |
| 5,720,533 A | * 2/1998 | Pastor et al. ................. 303/147 |
| 5,742,917 A | * 4/1998 | Matsuno ....................... 701/69 |
| 5,746,486 A | * 5/1998 | Paul et al. .................... 303/146 |
| 5,826,204 A | * 10/1998 | Ulm .............................. 701/41 |
| 5,839,799 A | * 11/1998 | Fukada ......................... 303/146 |
| 5,842,143 A | * 11/1998 | Lohrenz et al. ................ 701/34 |
| 5,842,754 A | * 12/1998 | Sano ............................. 303/147 |
| 5,857,160 A | * 1/1999 | Dickinson et al. ............. 701/41 |
| 5,869,753 A | * 2/1999 | Asanuma et al. ........... 73/117.3 |
| 5,899,952 A | * 5/1999 | Fukada ......................... 701/74 |
| 5,915,800 A | * 6/1999 | Hiwaashi et al. ............ 303/146 |

FOREIGN PATENT DOCUMENTS

| | | |
|---|---|---|
| DE | 19502858 | 7/1996 |
| EP | 0392165 | 10/1990 |
| JP | 4-19509 | 1/1992 |
| JP | 4-76462 | 3/1992 |
| JP | 6-115418 | 4/1994 |

\* cited by examiner

*Primary Examiner*—Jacques H. Louis-Jacques
(74) *Attorney, Agent, or Firm*—Oliff & Berridge, PLC

(57) ABSTRACT

In a behavior control device of a vehicle adapted to control the brake system according to a calculation based upon vehicle speed detected by a vehicle speed sensor, steering angle detected by a steering angle sensor, and yaw rate detected by a yaw rate sensor such that, when a deviation of the yaw rate detected by the yaw rate sensor relative to a standard yaw rate estimated from the vehicle speed and the steering angle increases beyond a threshold value, at least one of the wheels is braked by the brake system so as to generate a yaw moment in the vehicle body for decreasing the deviation of the yaw rate, the threshold value is temporarily increased until the yaw rate sensor is warmed up.

4 Claims, 6 Drawing Sheets

BEHAVIOR CONTROL DEVICE OF VEHICLE HAVING MEANS FOR AVOIDING MISCONTROL DUE TO NEUTRAL SHIFT OF YAW RATE SENSOR

BACKGROUND OF THE INVENTION

1. Field of the Invention

The present invention relates to a behavior control of a vehicle such as protecting a vehicle from spinning or drifting out, and more particularly, to a behavior control device of a vehicle adapted to estimate a saturation of the tire grip based upon a deviation of a yaw rate detected by a yaw rate sensor relative to a yaw rate calculated based upon vehicle speed and steering angle, for executing a control of the brake system of the vehicle to generate a turning moment in the vehicle acting against a spinning or a drifting out.

2. Description of the Prior Art

It is already known as described in, for example, Japanese Patent Laid-open Publication 6-115418, to execute a behavior control of a vehicle against a spinning or a drifting out by detecting that the tire grip condition is approaching a saturation based upon the above-mentioned deviation of the yaw rate. In order to accomplish such a behavior control satisfactorily, it is essential that the above-mentioned yaw rate deviation is estimated at a high precision.

However, the yaw rate sensors available to date are generally not definite in the performance thereof until they are substantially warmed up. Particularly, the presently available yaw rate sensors generally produce individually different outputs around a neutral point thereof according to each product. Such a fluctuation of the neutral point directly affects the precision of the estimation of the tire grip based upon the deviation of a yaw rate detected by the yaw rate sensor relative to a yaw rate calculated from vehicle speed and steering angle, rendering a behavior control based upon the estimation of the tire grip to be often improper in the warming up period of the yaw rate sensor.

SUMMARY OF THE INVENTION

In view of the above, it is a primary object of the present invention to provide an improved behavior control device of a vehicle having a vehicle body, a plurality of wheels suspended by the vehicle body, an engine, a steering system, and a brake system for selectively braking the wheels, the device comprising means for detecting vehicle speed, means for detecting steering angle, means for detecting yaw rate of the vehicle, and means for controlling the vehicle against a spin or a driftout according to a deviation of the yaw rate detected by the yaw rate sensor relative to a standard yaw rate estimated from the vehicle speed detected by the vehicle speed sensor and the steering angle detected by the vehicle speed sensor increasing beyond a threshold value toward a liability of the vehicle to spin or driftout, respectively, wherein any improper behavior control due to a neutral shift of the yaw rate sensor before the warming up thereof is definitely avoided.

According to the present invention, the above-mentioned primary object is accomplished by the behavior control device of the above-mentioned basic construction being improved such that the control means temporarily increases the threshold value to be higher until the yaw rate sensor is warmed up.

In the above-mentioned improvement, the warm-up of the yaw rate sensor may be judged by a predetermined time having lapsed from the start of the engine.

In the above-mentioned improvement, the control means may gradually decrease the magnitude of the increase of the threshold value according to the lapse of time from the increase thereof.

As an embodiment of the present invention, the control means may calculate an equivalent by steering angle of a neutral shift of the yaw rate sensor when the vehicle is running straight so as thereby to modify the steering angle detected by the steering angle sensor for a compensation of the neutral shift of the yaw rate sensor, and may dissolve the temporal increase of the threshold value at least for a predetermined period after an execution of the compensation even when the yaw rate sensor is not yet warmed up. In this case, the control means may calculate the equivalent by steering angle of the neutral shift of the yaw rate sensor as a mean value of each instant value thereof during a predetermined unit period. Further, the control means may modify the value of the yaw rate detected by the yaw rate sensor so as to compensate for a neutral shift of the yaw rate sensor according to an output thereof while the vehicle is stopped or running straight. Further, the control means may calculate the neutral shift of the yaw rate sensor as a mean value of an instant value thereof during a predetermined unit period.

BRIEF DESCRIPTION OF THE DRAWINGS

In the accompanying drawings.

DESCRIPTION OF THE PREFERRED EMBODIMENTS

In the following, the present invention will be described in more detail with respect to a preferred embodiment with reference to the accompanying drawings.

Figure 1:
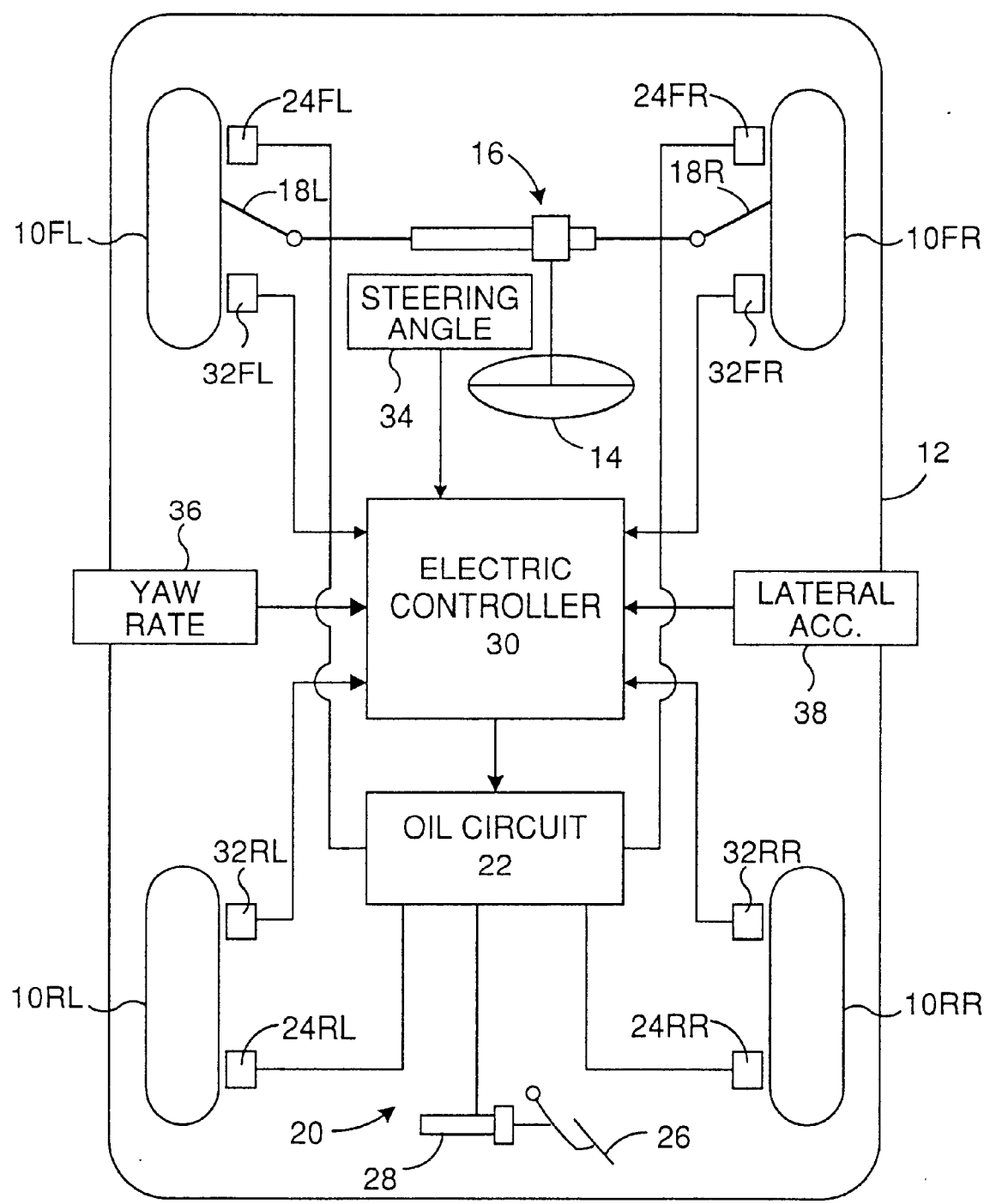
FIG. 1 is a diagrammatical plan view of a vehicle, showing parts and constructions thereof concerned with the present invention.

Referring to FIG. 1, a vehicle in which the present invention is incorporated in the form of an embodiment has a vehicle body 12, front left, front right, rear left and rear right wheels 10FL, 10FR, 10RL and 10RR suspended by the vehicle body 12, an engine not shown in the figure, and a brake system for selectively braking the wheels, the brake system including wheel cylinders 24FL, 24FR, 24RL and 24RR adapted to apply friction forces to the corresponding brake disks (not shown) of the front left, front right, rear left and rear right wheels, respectively, an oil circuit 22 for selectively supplying raised oil pressure to each of the wheel cylinders, and a combination of a brake pedal 26 and a master cylinder 28 connected with the oil circuit 22 for selectively raising the oil pressure supplied to the wheel cylinders according to a depression of the brake pedal by a driver. An electric controller 30 forming a brain of the behavior control device is constructed substantially by an electronic computer adapted to control the oil circuit 22 according to certain calculations based upon various parameters including at least wheel speed of each wheel detected by wheel speed sensors 32FL, 32FR, 32RL and 32RR for the front left, front right, rear left and rear right wheels, respectively, steering angle detected by a steering angle sensor 34, yaw rate detected by a yaw rate sensor 36, and lateral acceleration detected by a lateral acceleration sensor 38.

The construction of the behavior control device shown in FIG. 1 will be described hereinbelow from an aspect of the operation thereof by referring to the flowcharts shown in FIGS. 2–4.

Figure 2:
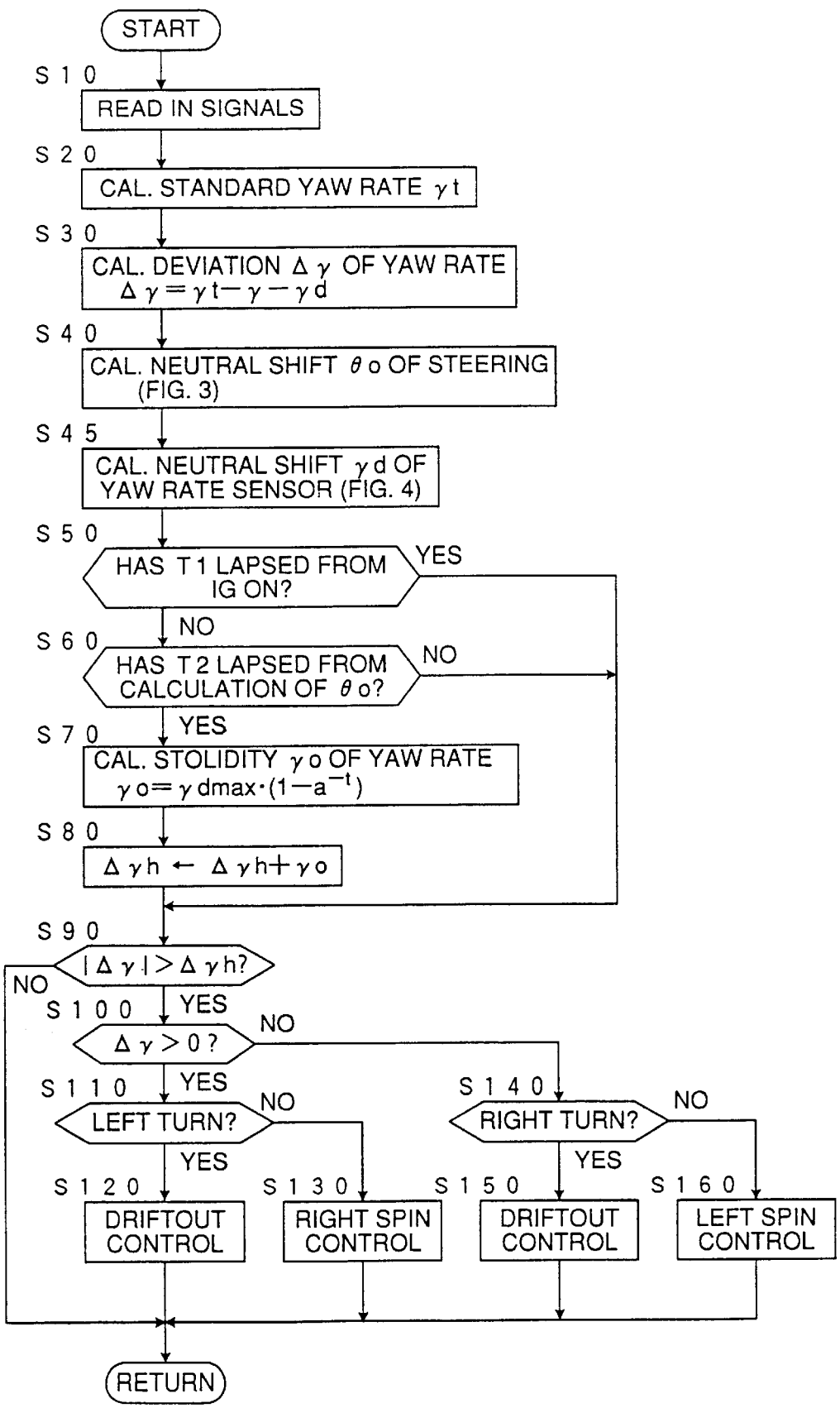
FIG. 2 is a flowchart showing an embodiment of the present invention from an aspect of the operation thereof.

Referring to FIG. 2, showing an overall flow of operation, when the control is started by a closure of an ignition switch not shown in the figure, in step 10 signals are read in from those sensors shown in FIG. 1, including wheel speed Vfl, Vfr, Vrl and Vrr detected by the wheel speed sensors 32FL, 32FR, 32RL and 32RR, respectively, steering angle θ from the steering angle sensor 34, yaw rate γ from the yaw rate sensor 36, and lateral acceleration Gy from the lateral acceleration sensor 38.

In step 20, a standard yaw rate γt which is a yaw rate estimated to be due based upon the vehicle speed and the steering angle when the tire grip is firm is calculated according to the following equations 1 and 2:

$$\gamma c = (\theta - \theta o) V/(R \cdot H) - Kh \cdot Gy \cdot V \quad (1)$$

$$\gamma t = \gamma c/(1 + T \cdot s) \quad (2)$$

In the above equations, V is vehicle speed which may be obtained from an average of wheel speeds Vfl-Vrr or one of them considered to be slipping the least at each moment, R is a steering gear ratio, H is a wheel base, Kh is a proportioning factor, T is a time constant, s is the Laplace operator, and θo is an equivalent by steering angle of a neutral shift of the yaw rate sensor 36, the equivalent θo being described in more detail hereinbelow.

In step 30, a deviation Δγ of the yaw rate detected by the yaw rate sensor 36 relative to the standard yaw rate is calculated according to the following equation 3:

$$\Delta\gamma = \gamma t - \gamma - \gamma d \quad (3)$$

In the above equation 3, γd is a neutral shift of the yaw rate sensor 36 calculated directly from the output of the yaw rate sensor 36 when the vehicle is running straight or stopped as described in detail hereinbelow with reference to FIG. 4. In equation 3, the term of γd may be omitted for a first convenience, with omission of the processing shown in the flowchart of FIG. 4.

In step 40, the above-mentioned equivalent θo by steering angle of the neutral shift of the yaw rate sensor 36 is calculated according to the processes shown in FIG. 3, the details of which will be described later.

In step 45, the neutral shift γd of the yaw rate sensor 36 is calculated according to the flowchart of FIG. 4, the details of which will be described later.

In step 50, it is checked if a predetermined time T1 has lapsed from the moment when the ignition switch was turned on. When the answer is no, the control proceeds to step 60.

Figure 3:
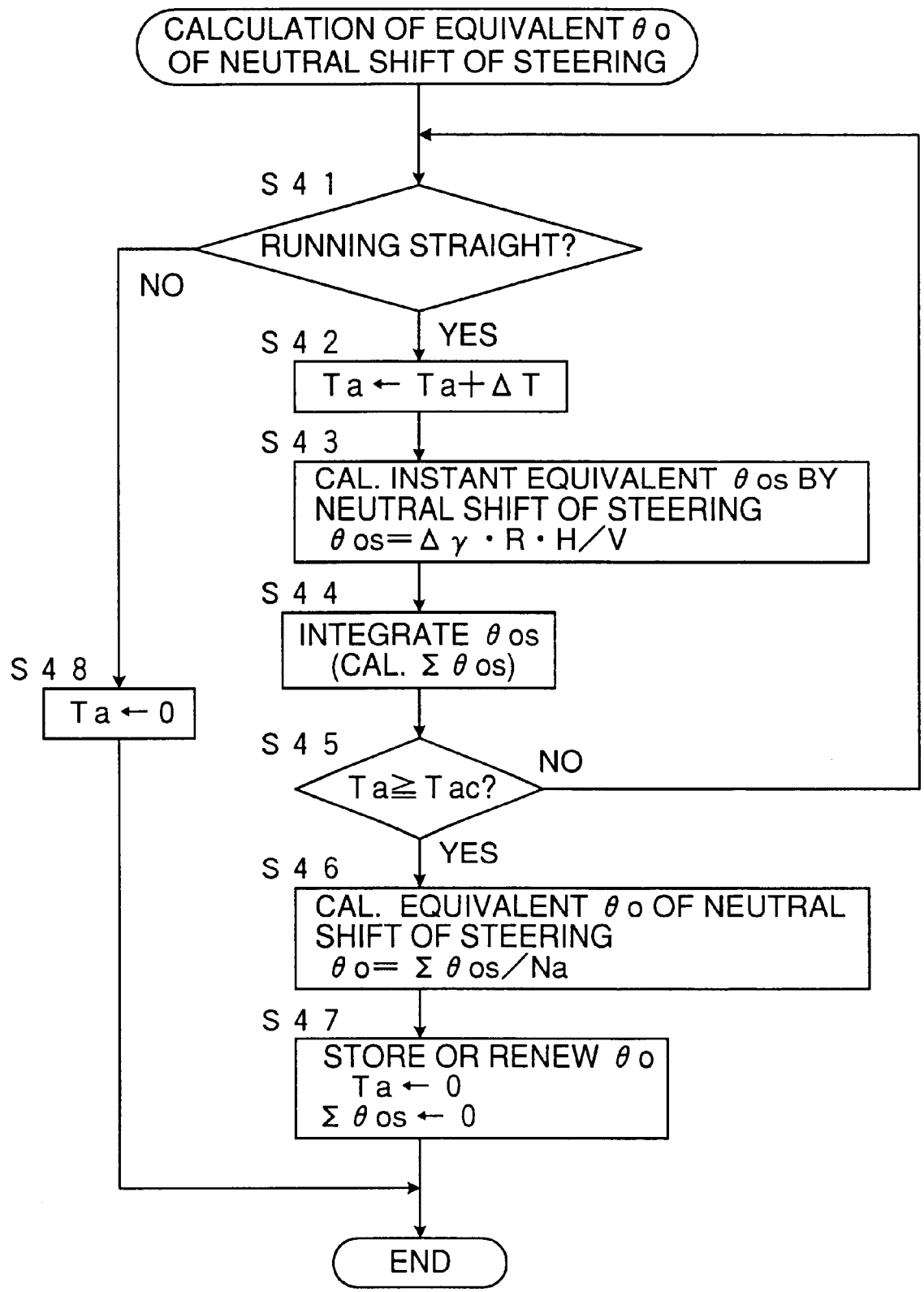
FIG. 3 is a flowchart showing a sub-routine incorporated in the flowchart of FIG. 2.

In step 60, it is checked if a predetermined time T2 has lapsed from the moment when the calculation of the neutral shift equivalent θo according to the flowchart of FIG. 3 was once finished. When the answer is yes, the control proceeds to step 70.

In step 70, a stolidity γo of the output of the yaw rate sensor 36 for an increase of the threshold value for executing the behavior control described hereinbelow with respect to steps 100–160 is calculated according to the following equation:

$$\gamma o = \gamma d\max \cdot (1 - a^{-t}) \quad (4)$$

In the above equation 4, γdmax is a maximum value of the stolidity, "a" is an appropriate base of the exponential function, and t is the time lapsed from the moment of calculation of θo.

In step 80, the threshold value Δγh for judging the deviation Δγ of the yaw rate γ detected by the yaw rate sensor 36 relative to the standard yaw rate γt estimated from the vehicle speed and the steering angle for executing the behavior control according to steps 100–160, is increased by the stolidity γo.

When the answer of step 50 is yes, i.e. when the time T1 has lapsed from the moment of closing the ignition switch so that the yaw rate sensor 36 may be deemed to have warmed up enough, with the neutral shift thereof being settled to a stable value, the control bypasses steps 60 and 70, so as to proceed directly to step 90. Further, when the answer of step 60 is no, i.e. when the time T2 has not yet lapsed from the calculation or renewal of the neutral shift equivalent θo in step 40, the control also proceeds directly to step 90, without modifying the threshold value Δγh by the stolidity γo of the yaw rate sensor 36 even in a non-warmed-up condition of the yaw rate sensor.

The value of γdmax is determined to be a maximum value of the stolidity γo just after a cold start of the engine, and therefore the yaw rate sensor. The exponential base "a" is determined in relation to the unit of time "t", so that the stolidity γo is gradually increased at a desirable rate according to the lapse of time from the moment of calculation of θo.

In step 90, it is checked if the absolute value of the deviation Δγ of the yaw rate detected by the yaw rate sensor 36 and the standard yaw rate estimated based upon the vehicle speed and the steering angle is larger than the threshold value Δγh. When the answer is no, the control returns to step 10, and no behavior control is executed. On the other hand, when the answer is yes, the control proceeds to step 100.

In step 100, it is checked if Δγ is positive. In the above-mentioned processes through steps 10–90, the parameters distinctive of the direction of turn of the vehicle are made positive when the vehicle is turning to the left, while the parameters are made negative when the vehicle is turning to the right. When the answer of step 100 is yes, the control proceeds to step 110, whereas when the answer of step 100 is no, the control proceeds to step 140.

In step 110, it is checked if the vehicle is turning to the left. When the answer is yes, the situation is judged such that the vehicle is turning to the left with the actual yaw rate γ being behind the theoretical standard yaw rate γt estimated from the vehicle speed and the steering angle, i.e. the vehicle is drifting out. Therefore, the control proceeds to step 120, and a driftout control is executed. In contrast, when the answer of step 110 is no, the situation is such that the vehicle is turning to the right with the actual yaw rate γ advancing the theoretical standard yaw rate γt, i.e. the vehicle is spinning. Therefore, the control proceeds to step 130, and a right spin control is executed.

In step 140, it is checked if the vehicle is turning to the right. When the answer is yes, the situation is such that the vehicle is turning to the right with the actual yaw rate γ being behind to the theoretical standard yaw rate γt, i.e. the vehicle is drifting out. Therefore, the control proceeds to step 150, and a driftout control is executed. In contrast, when the answer of step 140 is no, the situation is such that the vehicle is turning to the left with the actual yaw rate γ advancing the theoretical standard yaw rate γt, i.e. the vehicle is spinning to the left. Therefore, the control proceeds to step 160, and a left spin control is executed.

The driftout control, the right spin control and the left spin control executed in step 120 or 150, step 130 and step 160 will be described later in more detail with reference to FIGS. 5–8.

FIG. 3 is a flowchart of a sub-routine executed in step 40 of FIG. 2. According to this sub-routine, in step 41, it is checked if the vehicle is running straight. The judgment may be made based upon the output of the lateral acceleration sensor 38 or a limit switch (not shown) for detecting the neutral position of the steering system. When the answer is no, the process according to this sub-routine is immediately ended. Further, even when the control has once proceeded through steps 42–45 as described hereinbelow, the control is immediately stopped anytime when the answer of step 41 turns into no. When the control is ended directly from step 41, a time parameter Ta described in more detail hereinbelow is reset to zero in step 48. When the answer of step 41 is yes, i.e. the vehicle is running straight, the control proceeds to step 42, and the time parameter Ta is incremented by a small time unit ΔT.

In step 43, an instant equivalent θos by steering angle of a neutral shift Δγ of the yaw rate sensor 36 is calculated according to the following equation, by using the steering gear ratio R, the wheel base H and the vehicle speed V referred to in step 20:

$$\theta os = \Delta\gamma \cdot R \cdot H / V \quad (5)$$

As will be noted, the above process is to compensate for the neutral shift of the yaw rate sensor 36 in a feedback manner effected through the calculation of equation 1. In the shown embodiment of the invention, in order to avoid too frequent feedback modification of the steering angle θ, a time based mean value of θos is calculated, so as to provide θo as described hereinbelow.

In step 44, each instant value of θos is added up to the value of θos obtained in the preceding cycles through steps 41–47.

In step 45, it is checked if the time parameter Ta has reached a predetermined value Tac determined therefor. When the answer is no, the control returns to step 41, and the steps 41–45 are repeated as long as the vehicle is running straight, until the time parameter Ta reaches the value Tac. When the time parameter Ta reached the value Ta, the control proceeds to step 46.

In step 46, the equivalent θo by steering angle of the neutral shift Δγ is calculated as a mean value of each instant value θos during the time lapse corresponding to the time parameter value Tac, as follows:

$$\theta o = \Sigma \theta os / N \quad (6)$$

In the above equation 6, N is a count number of the repetition of the process through steps 41–45 until Ta reaches Tac by the repeated increment of ΔT.

In step 47, the newly obtained value of θo is stored or the already stored value of θo is renewed by the newly obtained θo, and thereafter the time parameter Ta and the sum of θos are reset to zero.

Thus, by the process of steps 41–47 being executed repetitively while the vehicle is running straight, after the warm-up of the yaw rate sensor 36, the neutral shift Δγ of the yaw rate sensor 36 is always calibrated as a mean value thereof over a predetermined period during the straight running condition of the vehicle, and is compensated for as a modification of the value of the steering angle θ used for the estimation of the deviation Δγ of the actual yaw rate γ detected by the yaw rate sensor relative to the theoretical standard yaw rate γt estimated from the vehicle speed and the steering angle, for the purpose of a behavior control of the vehicle.

Figure 4:
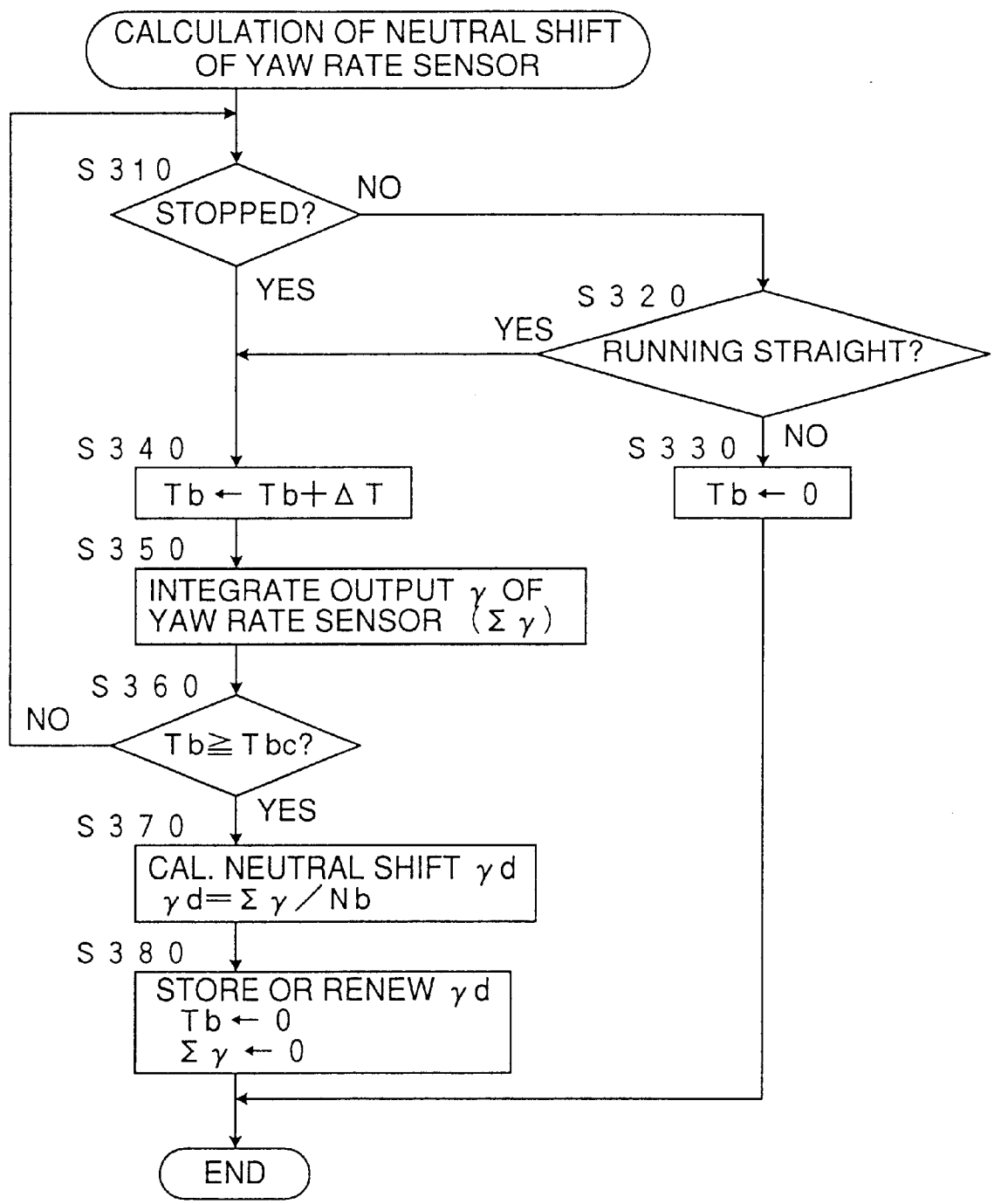
FIG. 4 is also a sub-routine incorporated in the flowchart of FIG. 2.

The calculation of the neutral shift γd of the yaw rate sensor 36 in step 45 of FIG. 2 is executed according to the process shown in the flowchart of FIG. 4. According to this flowchart, in step 310, it is checked if the vehicle is stopped. When the answer is yes, the control proceeds to step 340, whereas when the answer is no, the control proceeds to step 320, and it is checked if the vehicle is running straight. When the answer is yes, the control proceeds to step 340, whereas when the answer is no, the control proceeds to step 330, wherein a time parameter Tb described hereinbelow is reset to zero, and the control of this sub-routine is ended.

In step 340, the time parameter Tb is incremented by a small amount ΔT.

In step 350, the output γ of the yaw rate sensor 36 is integrated such that the instant output value of γ is added up to the value of γ obtained up to the preceding cycle.

In step 360, it is checked if the time parameter Tb has reached a predetermined value Tbc. When the answer is yes, the control proceeds to step 370, whereas if the answer is no, the control returns to step 310. Therefore, if the condition that the vehicle is at least stopped or running straight is lost after the control has started to circulate through steps 310–360 before the value Tbc is counted up, the process through this sub-routine is immediately ended.

In step 370, the value of the neutral shift γd is calculated as a mean value of each instant value of γ by the integrated value of γ being divided by a number Nb corresponding to the times of repetition of the process through steps 310–360.

In step 380, the newly obtained value of γd is stored or the value of γd obtained by the preceding process is replaced by the newly obtained value of γd, and thereafter the time parameter Tb and the integrated value of γ are both reset to zero.

Figure 6:
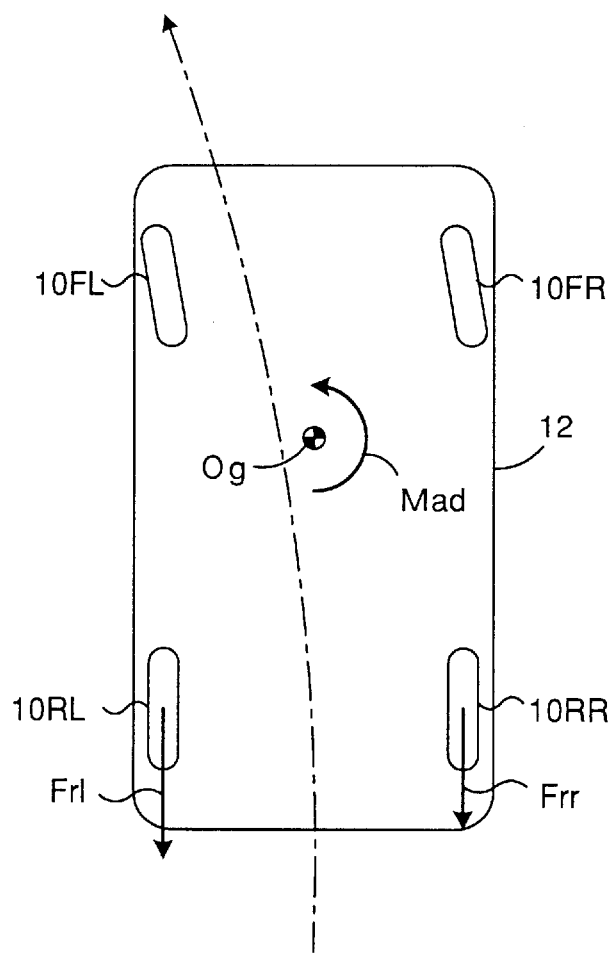
FIG. 6 is a diagrammatical plan view of a vehicle during a driftout suppress control.

In the driftout control in step 120 or step 150, as an embodiment, both of the rear left and rear right wheels 10RL and 10RR are braked to be applied with each controlled braking force such as Frl and Frr as shown in FIG. 6, so as to decelerate the vehicle, with a resultant effect that the driftout is suppressed. Further, in the embodiment shown in FIG. 6, the braking force Frl applied to the rear left wheel 10RL is made larger than the braking force Frr applied to the rear right wheel 10RR. Such an unbalance of the braking forces generates a yaw moment in the vehicle which is evaluated as Mad around the center of gravity Og of the vehicle. Therefore, the braking as a driftout control shown in FIG. 6 is more effective for the driftout control during a left turn of the vehicle. As is apparent, when the vehicle is turning to the right, a brake control with a larger braking force applied to the rear right wheel than to the rear left wheel is more effective as a driftout control.

Figure 5:
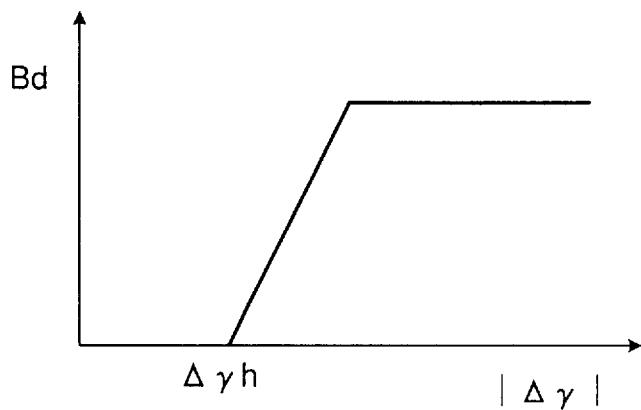
FIG. 5 is a map showing an example of the performance of the driftout suppress braking force Bd described hereinbelow relative to the absolute value of the yaw rate deviation $\Delta\gamma$.

FIG. 5 is a map showing an example of the relationship between the magnitude of the yaw rate deviation |Δγ| and the magnitude of the braking force Bd generally applied to the rear wheels for suppressing a driftout.

Figure 8:
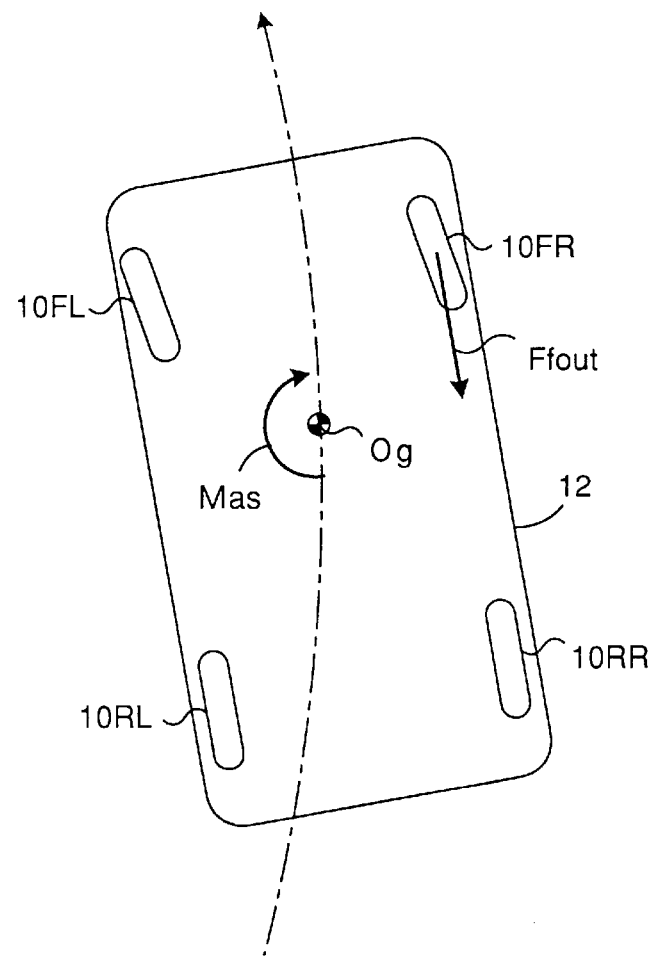
FIG. 8 is a diagrammatical plan view of a vehicle during a spin control.

In the left spin control of step 160, a braking is applied to the front right wheel 10FR as shown in FIG. 8. By a braking force being applied to the front right wheel 10FR, a clockwise turning moment is generated in the vehicle around the braked front right wheel 10FR by the inertia force of the vehicle concentrated at the center of gravity Og of the vehicle, thereby generating an equivalent clockwise yaw moment Mas around the center of gravity Og, acting against the spinning movement of the vehicle. As is also apparent, in the right spin control of step 130, a braking is applied to the front left wheel FL.

Figure 7:
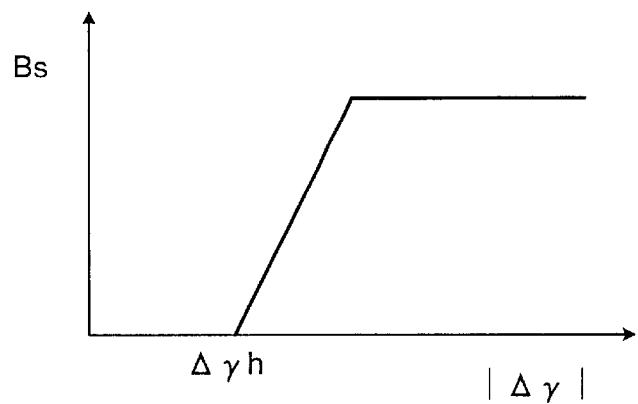
FIG. 7 is a map showing an example of the performance of the spin suppress braking force Bs described hereinbelow relative to the absolute value of the yaw rate deviation $\Delta\gamma$.

FIG. 7 is a map showing an example of the relationship between the magnitude of the yaw rate deviation $|\Delta\gamma|$ and the magnitude of the braking force Bs applied to the front wheel at the outside of the turn in the left or right spin control.

Although the invention has been described in detail with respect to some preferred embodiments thereof, it will be apparent for those skilled in the art that various modifications are possible without departing from the spirit of the present invention.

What is claimed is:

1. A behavior control device of a vehicle having a vehicle body, a plurality of wheels suspended by the vehicle body, an engine, a steering system, and a brake system for selectively braking the wheels, the device comprising:

means for detecting vehicle speed;

means for detecting steering angle;

means for detecting yaw rate of the vehicle; and means for controlling the vehicle against a spin or a driftout according to a deviation of the yaw rate detected by the yaw rate detecting means relative to a standard yaw rate estimated from the vehicle speed detected by the vehicle speed detecting means and the steering angle detected by the steering angle detecting means increasing beyond a threshold value toward a liability of the vehicle to spin or driftout, respectively, wherein the controlling means calculates an equivalent by steering angle of a neutral shift of the yaw rate detecting means when the vehicle is running straight so as thereby to modify the steering angle detected by the steering angle detecting means for a compensation of the neutral shift of the yaw rate detecting means while modifying the threshold value so as to be raised after a predetermined time has lapsed from the calculation of said equivalent.

2. A behavior control device according to claim 1, wherein the control means calculates the equivalent by steering angle of the neutral shift of the yaw rate sensor as a mean value of each instant value thereof during a predetermined unit period.

3. A behavior control device according to claim 1, wherein the control means modifies the value of the yaw rate detected by the yaw rate sensor so as to compensate for a neutral shift of the yaw rate sensor according to an output thereof while the vehicle is stopped or running straight.

4. A behavior control device according to claim 3, wherein the control means calculates the neutral shift of the yaw rate sensor as a mean value of an instant value thereof during a predetermined unit period.

* * * * *